(12) United States Patent
Mimura et al.

(10) Patent No.: US 12,724,899 B2
(45) Date of Patent: Sep. 1, 2026

(54) VULNERABILITY ANALYSIS METHOD AND VULNERABILITY ANALYSIS SYSTEM

(71) Applicant: Hitachi, Ltd., Tokyo (JP)

(72) Inventors: Nodoka Mimura, Tokyo (JP); Toshiyuki Saito, Tokyo (JP); Jens Doenhoff, Tokyo (JP); Hiroyuki Higaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 210 days.

(21) Appl. No.: 18/243,158

(22) Filed: Sep. 7, 2023

(65) Prior Publication Data

US 2024/0354418 A1 Oct. 24, 2024

(30) Foreign Application Priority Data

Apr. 19, 2023 (JP) ................................ 2023-068543

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01); *G06F 21/554* (2013.01)

(58) Field of Classification Search
None
See application file for complete search history.

(56) References Cited

U.S. PATENT DOCUMENTS 9,395,966 B1 * 7/2016 Watson ...................... G06F 8/60
2011/0022463 A1 * 1/2011 Harris ................ G06Q 30/0253 705/26.1
2014/0068561 A1 3/2014 Halder
2016/0189321 A1 * 6/2016 Halpern ................ G16H 80/00 705/2

(Continued)

FOREIGN PATENT DOCUMENTS

JP 2015-527679 A 9/2015
JP 2020021309 A * 2/2020 ............ G06F 21/57

(Continued)

*Primary Examiner* — Philip J Chea
*Assistant Examiner* — Bin Qing Zheng
(74) *Attorney, Agent, or Firm* — MATTINGLY & MALUR, PC

(57) ABSTRACT

A vulnerability analysis method including: acquisition processing of acquiring a component parts identifier, which is an identifier of component parts as parts configuring a product for each identifier of the product from each of a plurality of business operators, and business operator inherent data including an identifier of proprietary software but not included in the component parts from each of a plurality of business operators; correspondence identification processing of identifying a correspondence of an identifier of the product and the component parts identifier between different business operators based on previously created correspondence data; target product identification processing of identifying a target product as a product to be investigated; and vulnerability identification processing of identifying all of the proprietary software included in the target product based on the correspondence identification (Continued)

processing, and identifying vulnerability of software included in the target product by referring to a vulnerability DB storing data.

8 Claims, 18 Drawing Sheets

(56) References Cited

U.S. PATENT DOCUMENTS

| | | | | |
|---|---|---|---|---|
| 2021/0029153 | A1* | 1/2021 | Sugimoto | H04L 63/1441 |
| 2022/0035621 | A1 | 2/2022 | Nagano | |
| 2024/0095371 | A1* | 3/2024 | Uehara | G06F 21/577 |

FOREIGN PATENT DOCUMENTS

| | | | | |
|---|---|---|---|---|
| JP | WO 2020050355 | A1 * | 3/2020 | G06F 21/57 |
| JP | 2022-024404 | A | 2/2022 | |
| WO | WO-2023084791 | A1 * | 5/2023 | G06F 21/57 |

* cited by examiner

FIG. 2
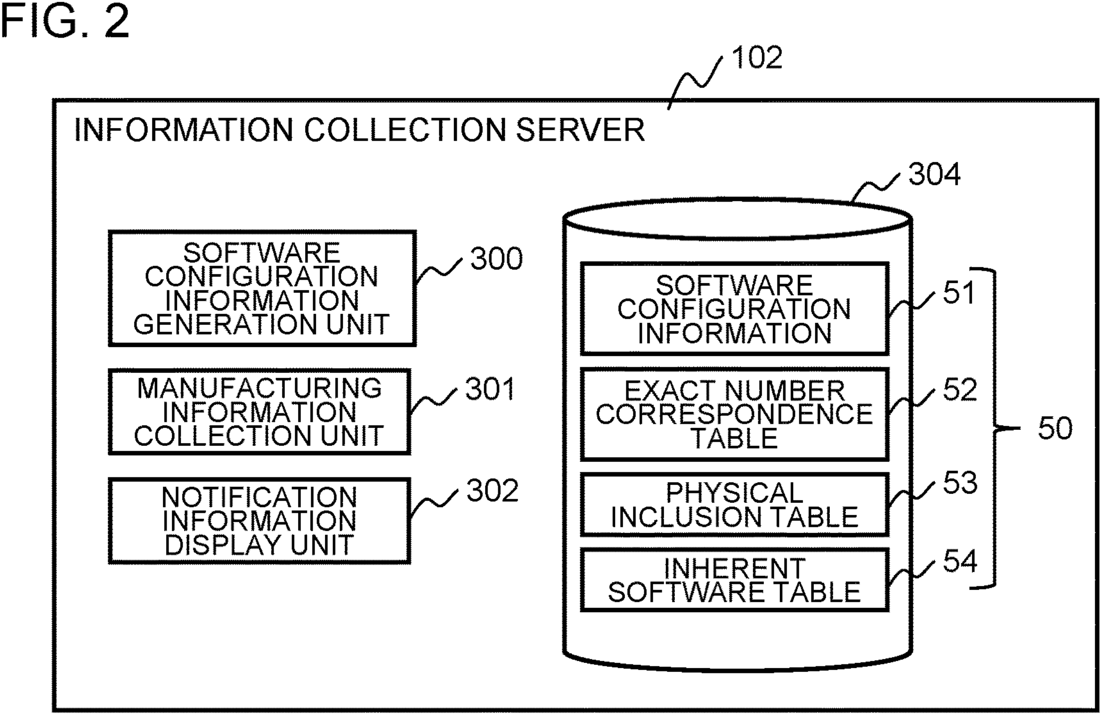
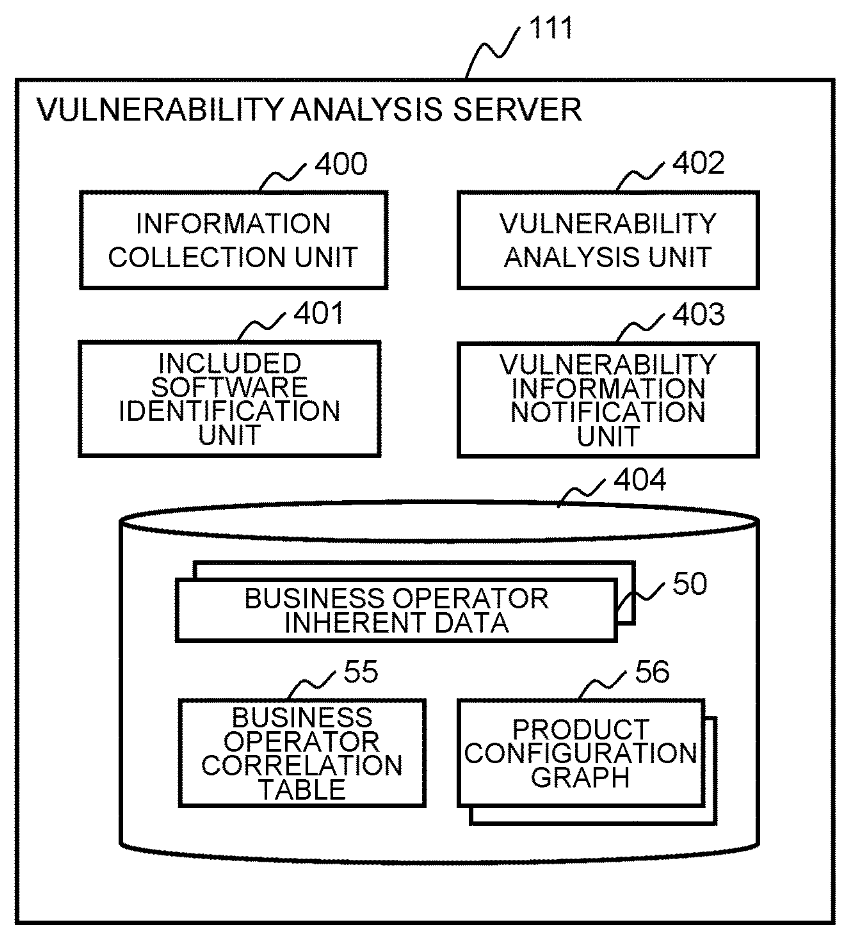

| BUSINESS OPERATOR: FIRST COMPANY | |
|---|---|
| SOFTWARE IDENTIFIER | COMPOSITION |
| SBOM001 | VENDOR NAME: 1st Corp<br>SOFTWARE NAME: SW-A<br>VERSION NAME: V1.0.1 |
| SBOM002 | VENDOR NAME: 1st Corp<br>SOFTWARE NAME: SW-A<br>VERSION NAME: V1.0.2 |
| ... | ... |

51-2

| BUSINESS OPERATOR: SECOND COMPANY | |
|---|---|
| SW IDENTIFIER | CONFIGURATION |
| SBOM2101 | VENDOR NAME: 2nd Corp<br>SOFTWARE NAME: SW-B<br>VERSION NAME: REV1 |
| SBOM2102 | VENDOR NAME: 2nd Corp<br>SOFTWARE NAME: SW-BB<br>VERSION NAME: REV3 |
| ... | ... |

51-3

| BUSINESS OPERATOR: THIRD COMPANY | |
|---|---|
| SBOM NAME | DETAILS |
| SBOM3456 | VENDOR NAME: 3rd Corp<br>SOFTWARE NAME: SW-D<br>VERSION NAME: 1.0.2 |
| ... | ... |

| BUSINESS OPERATOR: FIRST COMPANY | |
|---|---|
| SOFTWARE PART NUMBER | SOFTWARE IDENTIFIER |
| Sw001 | SBOM1001 |
| Sw002 | SBOM1002 |
| ... | ... |

52-2

| BUSINESS OPERATOR: SECOND COMPANY | |
|---|---|
| SW PART NUMBER | SW IDENTIFIER |
| SP-ABC-1 | SBOM2101 |
| SP-ABC-2 | SBOM2102 |
| ... | ... |

52-3

| BUSINESS OPERATOR: THIRD COMPANY | |
|---|---|
| SOFTWARE MANAGEMENT NUMBER | SOFTWARE IDENTIFIER |
| 212-1 | SBOM3455 |
| 212-2 | SBOM3456 |
| ... | ... |

| BUSINESS OPERATOR: FIRST COMPANY | |
|---|---|
| PRODUCT NUMBER | PART NUMBER |
| Prod001 | Part1-01、Part2-01 |
| Prod002 | Part1-02、Part2-02 |
| ... | ... |

53-2

| BUSINESS OPERATOR: SECOND COMPANY | |
|---|---|
| PRODUCT NUMBER | PART MANAGEMENT NUMBER |
| ABC | NONE |
| ABC2 | EXT-1 |
| ... | ... |

53-3

| BUSINESS OPERATOR: THIRD COMPANY | |
|---|---|
| PRODUCT NUMBER | PARTS NUMBER |
| 100212 | NONE |
| 100213 | NONE |
| ... | ... |

| BUSINESS OPERATOR: FIRST COMPANY | |
|---|---|
| PRODUCT NUMBER | SOFTWARE PART NUMBER |
| Prod001 | Sw001 |
| Prod002 | Sw002 |
| ... | ... |

54-2

| BUSINESS OPERATOR: SECOND COMPANY | |
|---|---|
| PRODUCT NUMBER | SOFTWARE PART NUMBER |
| ABC | SP-ABC-1 |
| ABD | SP-ABCD |
| ... | ... |

54-3

| BUSINESS OPERATOR: THIRD COMPANY | |
|---|---|
| PRODUCT NUMBER | SOFTWARE PART NUMBER |
| 100212 | 212-2 |
| 100213 | 213-1 |
| ... | ... |

| ITEM \ NAME OF ORGANIZATION | FIRST COMPANY | SECOND COMPANY | THIRD COMPANY |
| --- | --- | --- | --- |
| SOFTWARE IDENTIFIER | SOFTWARE IDENTIFIER | SW IDENTIFIER | SBOM NAME |
| SOFTWARE PART NUMBER | SOFTWARE PART NUMBER | SW PART NUMBER | SOFTWARE MANAGEMEN T NUMBER |
| PART NUMBER | PART NUMBER | PART MANAGEMENT NUMBER | PARTS NUMBER |
| PRODUCT NUMBER | PRODUCT NUMBER | PRODUCT NUMBER | PRODUCT NUMBER |
| CORRESPONDENC E OF PRODUCT NUMBER OF CHILD AND PART NUMBER OF PARENT | "Part" + COMPANY IDENTIFICATION NUMBER + SERIAL NUMBER | CORRESPONDE NCE TABLE | NO CHANGE |

SOFTWARE VULNERABILITY INFORMATION

| SOFTWARE CONFIGURATION INFORMATION | VULNERABILITY INFORMATION | PRODUCT NUMBER | PART NUMBER | MANUFACTURER |
|---|---|---|---|---|
| VENDOR NAME: VEND-C SOFTWARE NAME: SW-BB VERSION NAME: REV3 ... | URGENCY: HIGH DESCRIPTION: BUFFER OVERRUN ... | Prod002 | Part2-02 | SECOND COMPANY |
| | | ... | ... | ... |

204-2

SOFTWARE VULNERABILITY INFORMATION

| SOFTWARE CONFIGURATION INFORMATION | VULNERABILITY INFORMATION | PRODUCT NUMBER | SOFTWARE PART NUMBER |
|---|---|---|---|
| VENDOR NAME: VEND-C SOFTWARE NAME: SW-BB VERSION NAME: REV3 | URGENCY: HIGH DESCRIPTION: BUFFER OVERRUN | 100213 | Sw102 |
| | | ... | |

204-3

SOFTWARE VULNERABILITY INFORMATION

| SOFTWARE CONFIGURATION INFORMATION | VULNERABILITY INFORMATION | PART NUMBER | SOFTWARE PART NUMBER |
|---|---|---|---|
| NONE | NONE | NONE | NONE |

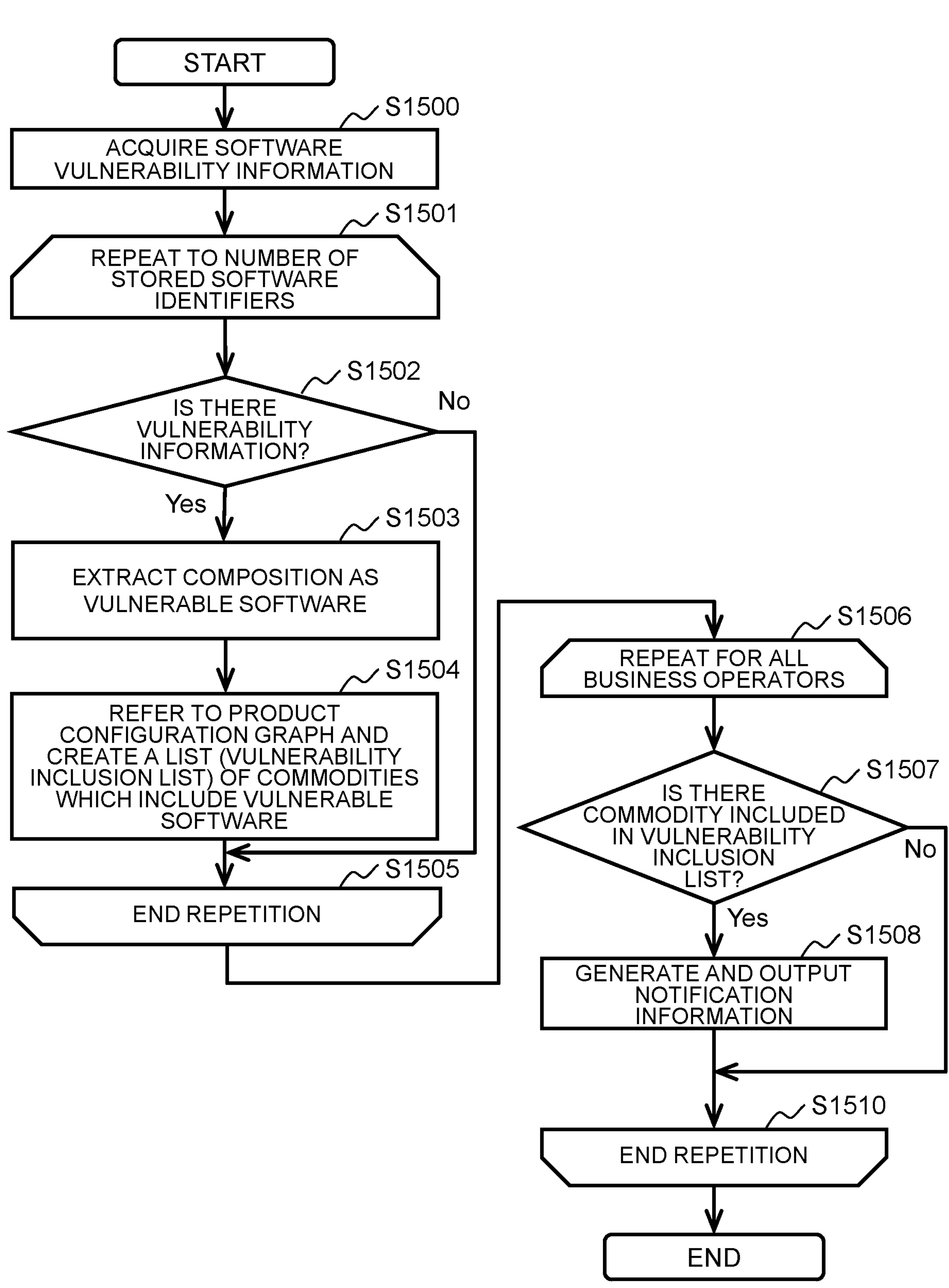
FIG. 14
START
S1500
ACQUIRE SOFTWARE VULNERABILITY INFORMATION
S1501
REPEAT TO NUMBER OF STORED SOFTWARE IDENTIFIERS
S1502
IS THERE VULNERABILITY INFORMATION?
No
Yes
S1503
EXTRACT COMPOSITION AS VULNERABLE SOFTWARE
S1504
REFER TO PRODUCT CONFIGURATION GRAPH AND CREATE A LIST (VULNERABILITY INCLUSION LIST) OF COMMODITIES WHICH INCLUDE VULNERABLE SOFTWARE
S1505
END REPETITION
S1506
REPEAT FOR ALL BUSINESS OPERATORS
S1507
IS THERE COMMODITY INCLUDED IN VULNERABILITY INCLUSION LIST?
No
Yes
S1508
GENERATE AND OUTPUT NOTIFICATION INFORMATION
S1510
END REPETITION
END FIG. 16
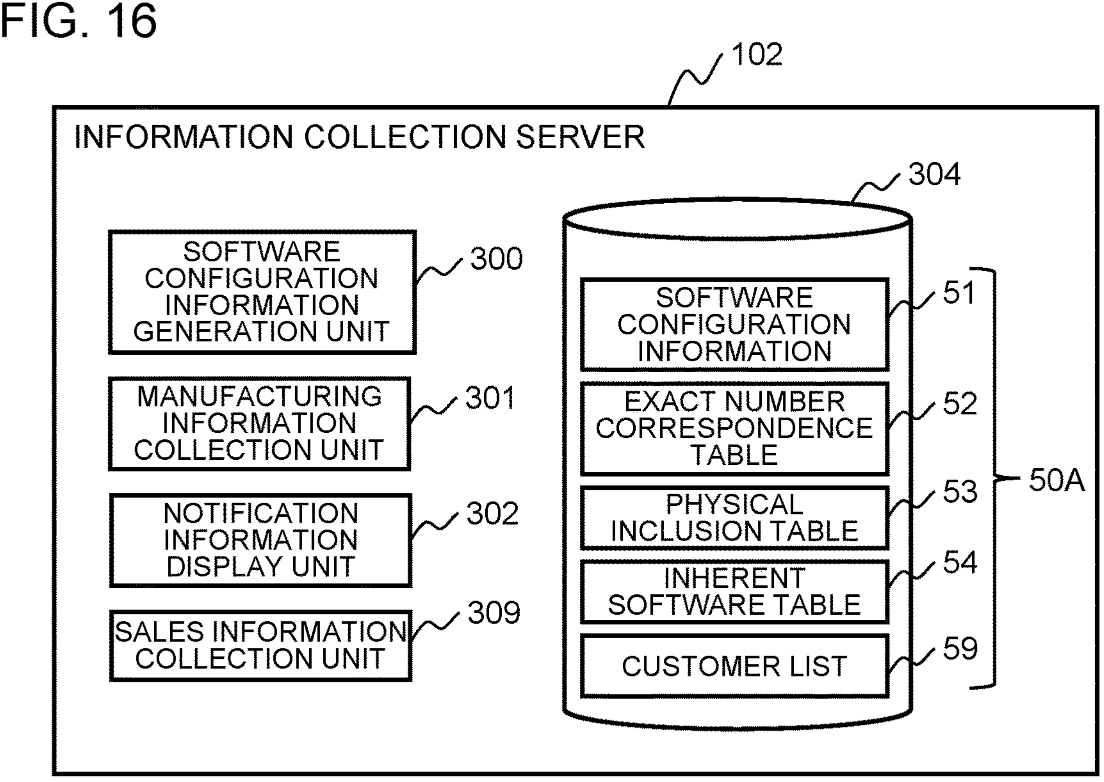
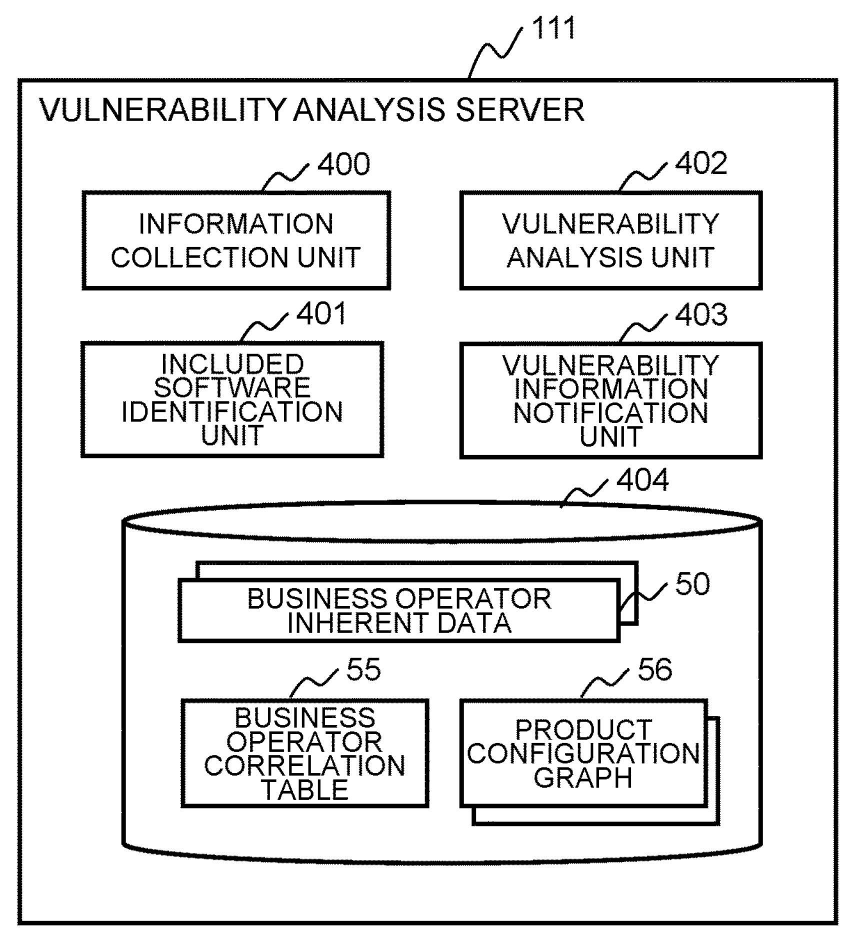

| BUSINESS OPERATOR: FIRST COMPANY | |
|---|---|
| CUSTOMER NUMBER | PRODUCT NUMBER |
| Cust001 | Prod001_001 |
| Cust002 | Prod001_002 |
| ··· | ··· |

59-2

| BUSINESS OPERATOR: SECOND COMPANY | |
|---|---|
| CUSTOMER NUMBER | PRODUCT NUMBER |
| 1001201 | ABC_001 |
| 1004421 | ABC_002 |
| ··· | ··· |

59-3

| BUSINESS OPERATOR: THIRD COMPANY | |
|---|---|
| CUSTOMER NUMBER | PRODUCT NUMBER |
| C01K001 | 100212-1 |
| C01K002 | 100212-2 |
| ··· | ··· |

SOFTWARE VULNERABILITY INFORMATION

| SOFTWARE CONFIGURATION INFORMATION | VULNERABILITY INFORMATION | PRODUCT NUMBER | PART NUMBER | MANUFACTURER | CUSTOMER |
|---|---|---|---|---|---|
| ... | ... | Prod002 | Part2-02 | SECOND COMPANY | Cust123 |
| | | ... | ... | ... | |

204A-2

SOFTWARE VULNERABILITY INFORMATION

| SOFTWARE CONFIGURATION INFORMATION | VULNERABILITY INFORMATION | PRODUCT NUMBER | SOFTWARE PART NUMBER | CUSTOMER |
|---|---|---|---|---|
| ... | ... | 100213 | Sw102 | 1005276 |
| | | ... | | |

204A-3

SOFTWARE VULNERABILITY INFORMATION

| SOFTWARE CONFIGURATION INFORMATION | VULNERABILITY INFORMATION | PART NUMBER | SOFTWARE PART NUMBER | CUSTOMER |
|---|---|---|---|---|
| NONE | NONE | NONE | NONE | NONE |

VULNERABILITY ANALYSIS METHOD AND VULNERABILITY ANALYSIS SYSTEM

CROSS-REFERENCE TO RELATED APPLICATION

The present application claims priority from Japanese application JP2023-068543, filed on Apr. 19, 2023, the content of which is hereby incorporated by reference into this application.

TECHNICAL FIELD

The present invention relates to a vulnerability analysis method and a vulnerability analysis system.

BACKGROUND ART

A supply chain is required for manufacturing products such as automobiles, and numerous parts suppliers are also involved in addition to OEMs. Software is installed for each product and for each part, and software configuration information such as the name and version thereof is individually managed by each OEM and each supplier. The package of each piece of software includes software and libraries of other companies and open-source software and libraries. These include security vulnerabilities, and may encounter a security attack. Japanese Unexamined Patent Application Publication No. 2020-21309 discloses a vulnerability management system which manages the vulnerability of software installed in a target product, comprising a configuration information collection unit which collects prescribed configuration information of the target product and stores it in a configuration information database, a vulnerability information collection unit which collects prescribed vulnerability information which was publicly announced or discovered and stores it in a vulnerability database, a target product ascertainment unit which extracts a target product to undergo vulnerability impact investigation based on the configuration information and the vulnerability information, and an impact investigation unit which executes impact investigation regarding the vulnerability of software installed in the target product extracted by the target product ascertainment unit.

SUMMARY OF THE INVENTION

Problems to be Solved by the Invention

While the invention described in PTL 1 targets the areas of IT (Information Technology) and IoT (Internet of Things), it is difficult to apply this configuration to the area of OT (Operational Technology). This is because, in the field of OT, the management method of software information tends to differ for each business operator, and it is difficult to integrate information across the business operators. In other words, with the invention described in PTL 1, there is room for improving the analysis of vulnerability targeting a supply chain.

Means to Solve the Problems

According to the 1st aspect of the present invention, a vulnerability analysis method executed by a computer, includes: acquisition processing of acquiring a component parts identifier, which is an identifier of component parts as parts configuring a product for each identifier of the product from each of a plurality of business operators, and business operator inherent data including an identifier of proprietary software as software configuring the product but not included in the component parts from each of a plurality of business operators; correspondence identification processing of identifying a correspondence of an identifier of the product and the component parts identifier between different business operators based on previously created correspondence data; target product identification processing of identifying a target product as a product to be investigated; and vulnerability identification processing of identifying all of the proprietary software included in the target product based on the correspondence identification processing, and identifying vulnerability of software included in the target product by referring to a vulnerability DB storing data related to vulnerability of software.

According to the 2nd aspect of the present invention, a vulnerability analysis system, includes: an information collection unit which acquires a component parts identifier, which is an identifier of component parts as parts configuring a product for each identifier of the product from each of a plurality of business operators, and business operator inherent data including an identifier of proprietary software as software configuring the product but not included in the component parts from each of a plurality of business operators; an included software identification unit of creating a product configuration graph indicating a relation of the product and the proprietary software by identifying a correspondence of an identifier of the product and the component parts identifier between different business operators based on previously created correspondence data and the business operator inherent data; and a vulnerability analysis unit of identifying all of the proprietary software included in the target product as the target to be investigated, and identifying vulnerability of software included in the target product by referring to a vulnerability DB storing data related to vulnerability of software.

Advantageous Effects of the Invention

According to the present invention, the vulnerability of software can be analyzed across a plurality of business operators configuring a supply chain.

BRIEF DESCRIPTION OF DRAWINGS

FIG. 2 is a configuration diagram of the information collection server and the vulnerability analysis server.

FIG. 5 is a diagram showing an example of the software configuration information.

FIG. 6 is a diagram showing an example of the exact number correspondence table.

FIG. 7 is a diagram showing an example of the physical inclusion table.

FIG. 8 is a diagram showing an example of the inherent software table.

FIG. 9 is a diagram showing an example of the business operator correlation table.

FIG. 12 is a diagram showing an example of a screen display that the notification information display unit outputs to the output device in the first embodiment.

FIG. 14 is a flowchart showing the processing of the vulnerability analysis unit.

FIG. 16 is a configuration diagram of the information collection server and the vulnerability analysis server in the second embodiment.

FIG. 17 is a diagram showing an example of the customer list.

FIG. 18 is a diagram showing an example of a screen display that the notification information display unit outputs to the output device in the second embodiment.

DESCRIPTION OF EMBODIMENTS

First Embodiment

The first embodiment of the vulnerability analysis method and the vulnerability analysis system is now explained with reference to FIG. 1 to FIG. 15.

Figure 1:
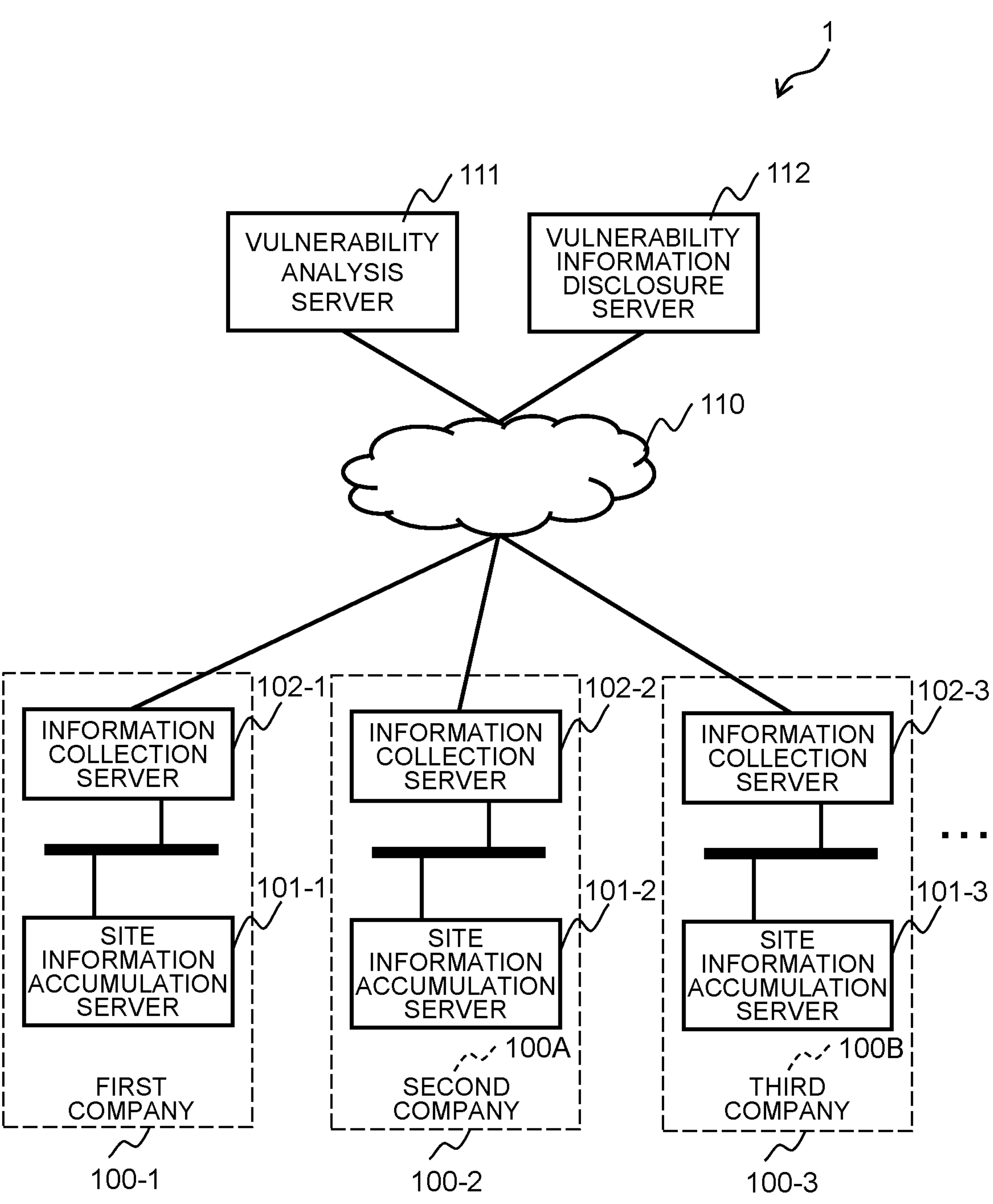
FIG. 1 is an overall configuration diagram of the vulnerability analysis system.

FIG. 1 is an overall configuration diagram of the vulnerability analysis system 1. The vulnerability analysis system 1 includes a vulnerability analysis server 111, a vulnerability information disclosure server 112, and a plurality of business operators 100. The vulnerability analysis server 111, the vulnerability information disclosure server 112, and the plurality of business operators 100 are connected via a network 110. The network 110 may be the Internet, or a closed network using an exclusive line or the like.

FIG. 1 shows three business operators 100; that is, a first company 100-1, a second company 100-2, and a third company 100-3. There is no upper limit in the number of business operators to be included in the vulnerability analysis system 1, so as long as there are two or more business operators. All business operators commonly comprise the configuration explained in this embodiment. Each business operator may differ in parts other than those explained in this embodiment. Each business operator 100 comprises an information collection server 102 and a site information accumulation server 101. In this embodiment, branch numbers are assigned to indicate that the configuration is the same, but the stored data is different. The site information accumulation server 101 stores various types of information of each business operator 100.

FIG. 2 is a configuration diagram of the information collection server 102 and the vulnerability analysis server 111. The information collection server 102 comprises a software configuration information generation unit 300, a manufacturing information collection unit 301, a notification information display unit 302, and an information collection/storage unit 304. The information collection/storage unit 304 stores software configuration information 51, an exact number correspondence table 52, a physical inclusion table 53, and an inherent software table 54. In the following explanation, the software configuration information 51, the exact number correspondence table 52, the physical inclusion table 53, and the inherent software table 54 are collectively referred to as the business operator inherent data 50.

The software configuration information 51 is a correspondence table of a software identifier as an identifier of software and a composition of software. The software identifier is an identifier for identifying individual software. The software identifier has uniqueness in the vulnerability analysis system 1. Nevertheless, a different software identifier is assigned even for software having the same name created in the same business operator 100 if the version is different. In this embodiment, a software identifier is a combination of "SBOM" and a number.

The exact number correspondence table 52 is a correspondence table of a software identifier and a software part number. The software part number is an identifier of software that is broadly used in each of the business operators 100. As with the software identifier, a different software part number is assigned even for software having the same name created in the same business operator 100 if the version is different. Thus, in the exact number correspondence table 52, a software identifier and a software part number are indicated with a correspondence relation of 1:1. Nevertheless, with regard to the software part number, uniqueness is guaranteed only in each of the business operators 100.

The physical inclusion table 53 is a correspondence table of a product number as an identifier of a product, and a part number as an identifier of the parts configuring the product. While it is often the case that one or more parts configure a product, there are also cases where a product does not include any parts as described later. Nevertheless, the uniqueness of the product number and the part number is guaranteed only in each of the business operators 100. The identifier of the product and its parts in this embodiment is used for identifying the production lot or design. For example, the same identifier is assigned to products manufactured in the same production lot. Nevertheless, when the identifier of inherent software or the identifier of constituent parts is changed, then the identifier of the product is also changed.

The inherent software table 54 is a correspondence table of a product number, and a software part number of software which configures the product represented by the product number but is not included in the parts. The software part number corresponding to the product number is 0 or higher. In other words, there may be cases where additional software is not added other than the software installed in the parts, and cases where a plurality of pieces of software are added. The term "inherent" of the inherent software table 54 is merely referred to as "inherent" in the meaning that it is not included in the parts. There may be cases where an identifier of software common to a plurality of products is indicated in the inherent software table 54.

Note that, with the three servers of the information collection server 102-1, the information collection server 102-2, and the information collection server 102-3 shown in FIG. 1, operation of the software configuration information generation unit 300, the manufacturing information collection unit 301, and the notification information display unit 302 is common, and the specific contents of the business operator inherent data 50 are different.

The software configuration information generation unit 300 acquires various types of information from the site information accumulation server 101, and generates the software configuration information 51. The manufacturing information collection unit 301 acquires various types of information from the site information accumulation server 101, and generates the exact number correspondence table 52, the physical inclusion table 53, and the inherent software table 54. Note that the software configuration information generation unit 300 and the manufacturing information collection unit 301 may also generate the software configuration information 51 and the like by using the information input from the input device 203 described above.

The notification information display unit 302 sends the notice received from the vulnerability analysis server 111 to a person working at the business operator 100. Details will be described later. The information collection/storage unit 304 is a non-volatile storage apparatus such as a hard disk device.

The vulnerability analysis server 111 comprises an information collection unit 400, an included software identification unit 401, a vulnerability analysis unit 402, a vulnerability information notification unit 403, and a vulnerability analysis server storage unit 404. The vulnerability analysis server storage unit 404 stores inherent data 50 of a plurality of business operators, a business operator correlation table 55, and a configuration graph 56 of a plurality of products. Nevertheless, the explanation of the product configuration graph 56 is described for the sake of convenience, and the product configuration graph 56 does not need to be stored in the vulnerability analysis server storage unit 404. The business operator correlation table 55 is stored in the vulnerability analysis server storage unit 404 in advance.

The information collection unit 400 collects the business operator inherent data 50 from each information collection server 102 and stores the collected business operator inherent data 50 in the vulnerability analysis server storage unit 404. The included software identification unit 401 creates the product configuration graph 56 with one of the products as the target product, and identifies the software included in each product. The vulnerability analysis unit 402 refers to the vulnerability information disclosure server 112 and determines the vulnerability of each piece of software. When it is discovered that the software has vulnerability, the vulnerability analysis unit 402 additionally acquires information of such vulnerability. The vulnerability information notification unit 403 notifies the information of vulnerability acquired by the vulnerability analysis unit 402 to each information collection server 102. The notification information display unit 302 of the information collection server 102 is operated based on the notice output by the vulnerability information notification unit 403.

Figure 3:
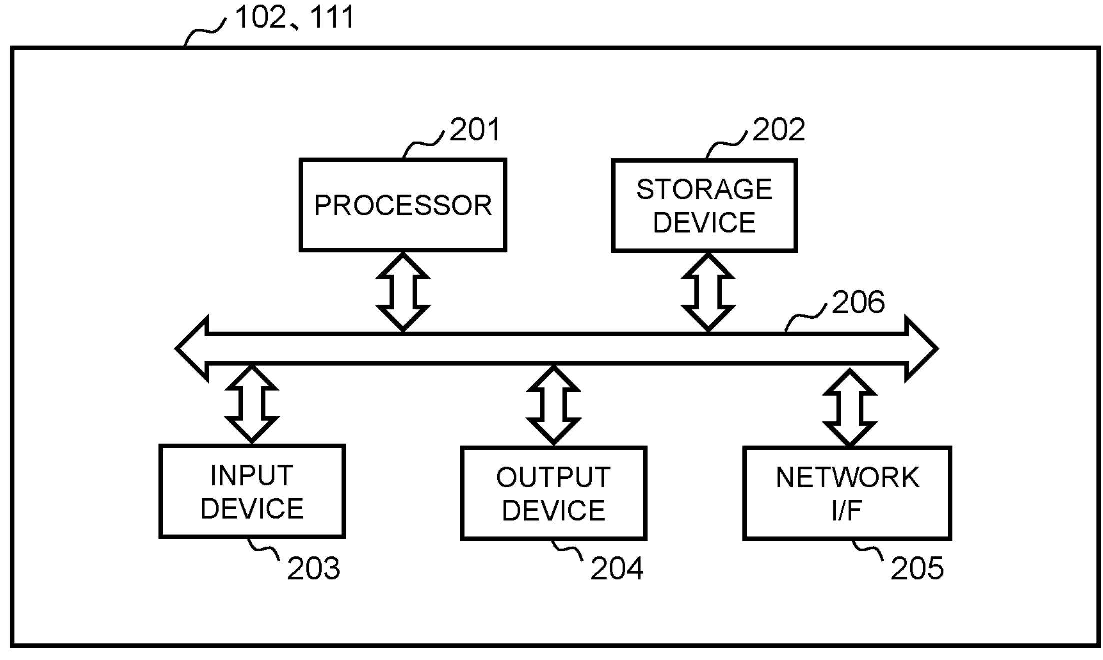
FIG. 3 is a hardware configuration diagram of the information collection server and the vulnerability analysis server.

FIG. 3 is a hardware configuration diagram of the information collection server 102 and the vulnerability analysis server 111. Nevertheless, FIG. 3 merely shows the hardware configuration that is common to the information collection server 102 and the vulnerability analysis server 111. To put it differently, FIG. 3 is not showing that the hardware configuration of the information collection server 102 and the hardware configuration of the vulnerability analysis server 111 are the same. Moreover, while FIG. 3 depicts that the information collection server 102 and the vulnerability analysis server 111 are each configured from a plurality of arithmetic units of a single apparatus, the information collection server 102 and the vulnerability analysis server 111 may also each be configured from a plurality of arithmetic units.

The information collection server 102 and the vulnerability analysis server 111 comprise a processor 201, a storage device 202, an input device 203, an output device 204, a network interface 205, and a communication bus 206. The processor 201, the storage device 202, the input device 203, the output device 204, and the network interface 205 are connected via a communication bus 206.

The processor 201 is a central processing unit, and realizes the various functions described above by executing the programs stored in the storage device 202 as a non-volatile storage apparatus. The storage device 202 is a ROM, a flash memory, a hard disk drive or the like. The input device 203 is, for example, a keyboard or a mouse. The information collection server 102 and the vulnerability analysis server 111 do not need to comprise the input device 203. The output device 204 is, for example, a liquid crystal display or a speaker. The network interface 205 realizes communication via the network 110.

Figure 4:
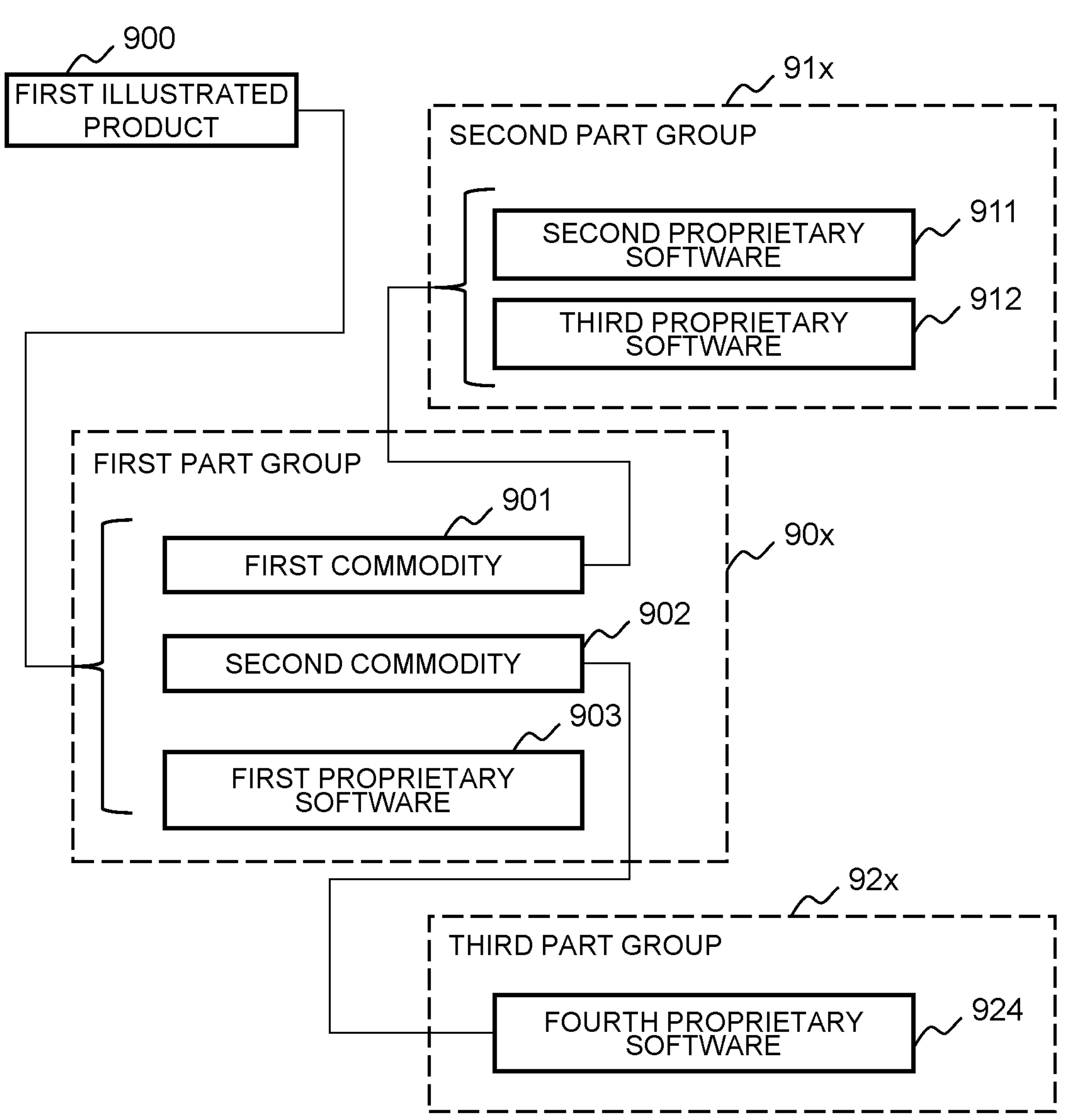
FIG. 4 is a diagram showing an example of the product configuration.

FIG. 4 is a diagram showing an example of the product configuration. Nevertheless, FIG. 4 does not depict commodities that do not include any software. The first illustrated product 900 is configured from a first part group 90*x*. The first part group 90*x* is configured from a first commodity 901, a second commodity 902, and first proprietary software 903. The first commodity 901 is configured from a second part group 91*x*. The second part group 91*x* is configured from second proprietary software 911 and third proprietary software 912. The second commodity 902 is configured from a third part group 92*x*. The third part group 92*x* is configured from fourth proprietary software 924.

The first illustrated product 900 and the first part group 90*x* are of a relation of a product and its parts. The first commodity 901 and the second part group 91*x* are of a relation of a product and its parts. Accordingly, the relation of a product and its parts is strung together like beads, and whether a commodity corresponds to a “product” or “parts” is determined depending on to which manufacturing process of the commodity attention is given. Note that, in the example shown in FIG. 4, while a commodity was not included in the second part group 91*x* and the third part group 92*x*, the second part group 91*x* and the third part group 92*x* may also include a commodity including software. In the foregoing case, the right side of FIG. 4 will continue to extend.

FIG. 5 is a diagram showing an example of the software configuration information 51. Specifically, FIG. 5 shows software configuration information 51-1 to 51-3 that can be obtained from each of the first company 100-1, the second company 100-2, and the third company 100-3. The software configuration information 51 has one or more records, and each record includes a software identifier and a composition. Nevertheless, there are cases where the record name differs for each company, and they are not necessary the same. With that said, however, the record of each piece of software configuration information 51 includes data corresponding to the software identifier and the software composition. Note that the software identifier is an identifier for identifying individual software, and a different software identifier is assigned even for software having the same function created by the same creator if the version is different.

FIG. 6 is a diagram showing an example of the exact number correspondence table 52. Specifically, FIG. 6 shows exact number correspondence tables 52-1 to 52-3 that can be obtained from each of the first company 100-1, the second company 100-2, and the third company 100-3. The exact number correspondence table 52 has one or more records, and each record includes a software part number and a software identifier. The exact number correspondence tables 52-1 to 52-3 may have different record names for each company, and the record names are not necessary the same. Nevertheless, the record of each exact number correspondence table 52 includes data corresponding to the software part number and the software identifier.

The difference between the software part number and the software identifier is mainly in the method of use, and the main objective of the software part number is for use in managing the software within each company, whereas the software identifier is for use in managing the vulnerability information. In other words, the software part number and the software identifier are common with respect to the point of strictly identifying software, including differences in the version numbers. Thus, here, a table indicating the relation of the software part number and the software identifier is referred to as the exact number correspondence table 52.

FIG. 7 is a diagram showing an example of the physical inclusion table 53. The physical inclusion table 53 shows the relation of a product and its parts for each business operator. Specifically, FIG. 7 shows physical inclusion tables 53-1 to 53-3 that can be obtained from each of the first company 100-1, the second company 100-2, and the third company 100-3. The physical inclusion table 53 has one or more records, and each record shows a correspondence relation of 1:1 of the product number and the part number.

FIG. 8 is a diagram showing an example of the inherent software table 54. The inherent software table 54 shows the software that is inherent to the product for each business operator. Specifically, the inherent software table 54 shows one or more software part numbers corresponding to the product number.

FIG. 9 is a diagram showing an example of the business operator correlation table 55. The business operator correlation table 55 is a table showing the correspondence of the part number and the product number in different business operators 100. Specifically, FIG. 9 shows the correspondence of the item names and the correspondence of the product number and the part number in the software configuration information 51, the exact number correspondence table 52, the physical inclusion table 53, and the inherent software table 54. Specifically, line 1 to line 4 of the business operator correlation table 55 show the names of the software identifier, the software part number, the part number, and the product number for each business operator 100.

For example, when the description of line 1 of the business operator correlation table 55 is applied to the exact number correspondence table 52 shown in FIG. 6, the following can be understood. In other words, "software part number" in the exact number correspondence table 52-1 of the first company 100-1, "SW part number" in the exact number correspondence table 52-2 of the second company 100-2, and "software management number" in the exact number correspondence table 52-3 of the third company 100-3 have the same meaning. While the correspondence relation can be easily identified in FIG. 6 and other diagrams since only the corresponding sections have been extracted, when there are numerous items, the business operator correlation table 55 is useful.

Moreover, line 5 of the business operator correlation table 55 shows the correspondence relation of the part number in the corresponding business operator 100 and the product number in another business operator. For example, with the first company 100-1, it is shown that the combination of the character string "Part", identification number of the business operator 100 that manufactured the parts, and serial number of the product for each business operator 100 that manufactured the parts is used as the part number. The identification number of the business operator 100 is being separately managed, and in this embodiment "1" is set for the second company 100-2 and "2" is set for the third company 100-3. Moreover, with the second company 100-2, it is shown that the correspondence relation of the part number in the second company 100-2 and the product number in another business operator 100 is indicated in a separately existing correspondence table (not shown).

Figure 10:
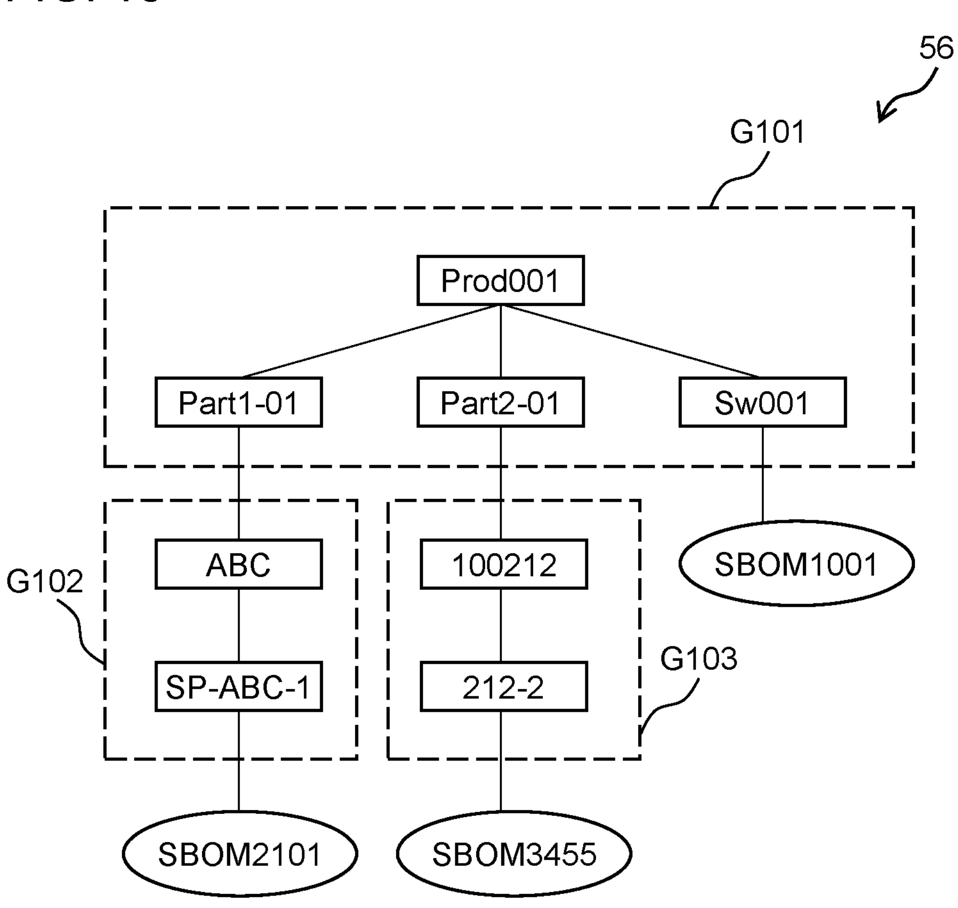
FIG. 10 is a diagram showing a first example of the product configuration graph.

FIG. 10 is a diagram showing a first example of the product configuration graph 56 generated by the included software identification unit 401. In FIG. 10, with "Prod001" of the first company 100-1 as the target product, the software included in "Prod001" is identified. A first area G101 surrounded with a broken line in FIG. 10 shows the name of the commodity in the first company 100-1, a second area G102 shows the name of the commodity in the second company 100-2, and a third area G103 shows the name of the commodity in the third company 100-3. The character string surrounded with an oval in FIG. 10 is the software identifier, and the character string surrounded with a square is one among a product number, a part number, and software part number.

The included software identification unit 401 foremost refers to the physical inclusion table 53, and identifies the part number of the parts configuring "Prod001" as the target product. Furthermore, the included software identification unit 401 refers to the inherent software table 54, and identifies the number of the software parts configuring "Prod001". The description of the first area G101 is thereby completed based on the foregoing identifications. Next, the included software identification unit 401 refers to the business operator correlation table 55 for identifying the product number in another business operator 100 corresponding to the part number in the first company 100-1. Based on this reference, it is identified that "Part1-01" in the first company 100-1 corresponds to "ABC" in the second company 100-2, and "Part2-01" in the first company 100-1 corresponds to "100212" in the third company 100-3.

Next, the included software identification unit 401 refers to the physical inclusion table 53 and the inherent software table 54 and identifies "SP-ABC-1" and "212-2" as the software included in each of the parts. Finally, the included software identification unit 401 refers to the exact number correspondence table 52, and completes the product configuration graph 56 by identifying the software identifier corresponding to each of the software parts. In the example shown in FIG. 10, it is shown that "Prod001" as the target product includes the software having the software identifiers of "SBOM1001", "SBOM2101", and "SBOM3455".

Figure 11:
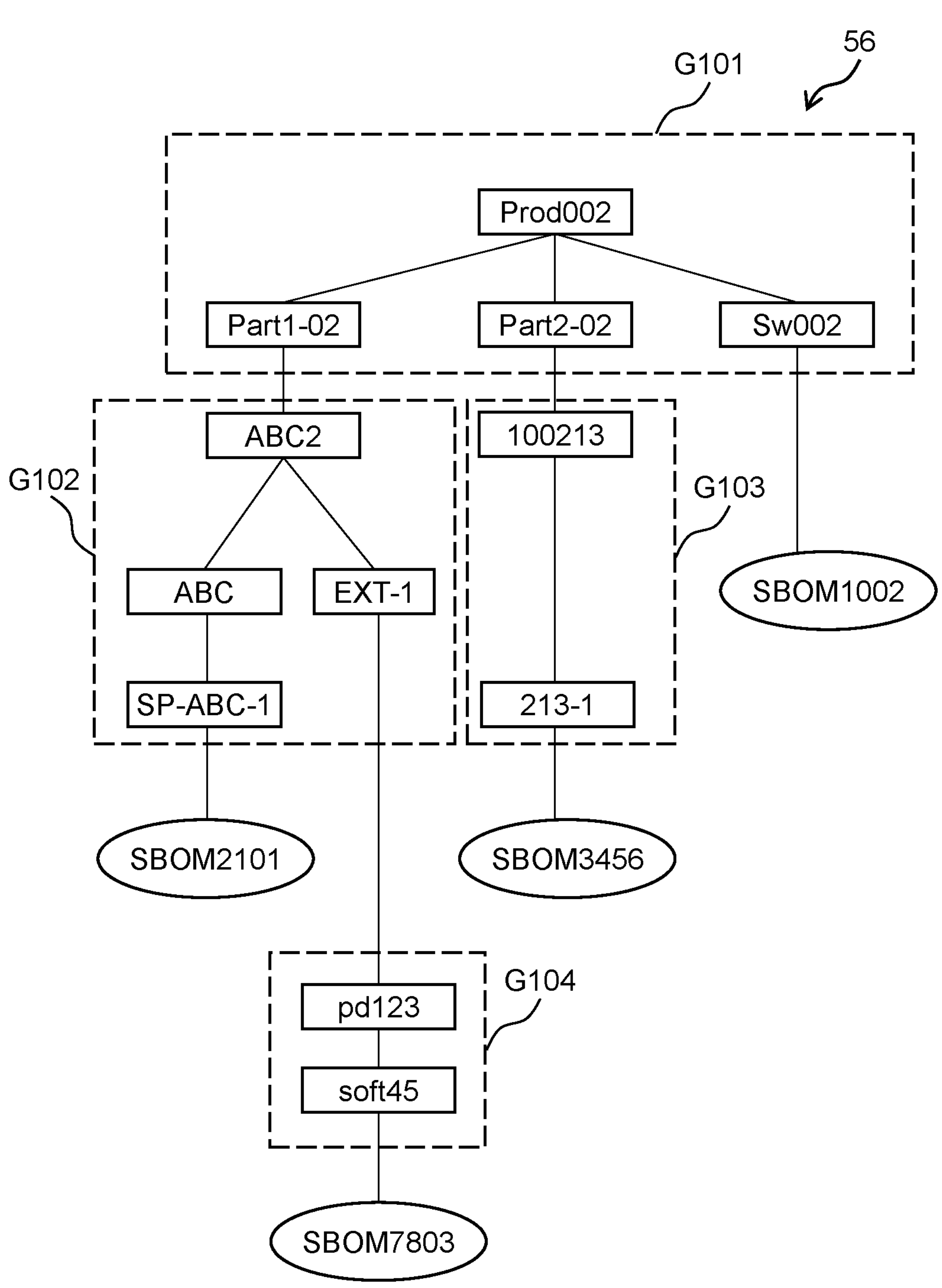
FIG. 11 is a diagram showing a second example of the product configuration graph.

FIG. 11 is a diagram showing a second example of the product configuration graph 56 generated by the included software identification unit 401. In FIG. 11, with "Prod002" of the first company 100-1 as the target product, the software included in "Prod001" is identified. In the following explanation, the differences in comparison to FIG. 10 will be mainly explained. As indicated in the table of reference number 53-1 of FIG. 7 and the table of reference number 54-1 of FIG. 8, since the number of the constituent parts and the number of the software parts of "Prod002" are different from those of "Prod001", those differences are reflected in the area G101 of FIG. 11. A fourth area G104 shows the name of the commodity in a fourth company that has not been previously depicted.

The included software identification unit 401 identifies "ABC2" and "100213" as the names of the parts in other business operators 100 corresponding to the name of the parts in the first company 100-1. Since the physical inclusion table 53-2 shows that the product number "ABC2" includes "EXT-1", the included software identification unit 401 reflects this in the area G102. The included software identification unit 401 identifies "pd123" as the software part number in another business operator 100 corresponding to "EXT-1" in the second company 100-2. Furthermore, while not depicted in FIG. 6 or FIG. 7, the included software identification unit 401 refers to the exact number correspondence table 52 and the physical inclusion table 53 and identifies that "pd123" includes "soft45" as inherent software, and indicates this in the area G104.

Finally, the included software identification unit 401 refers to the exact number correspondence table 52, and completes the product configuration graph 56 by identifying the software identifier corresponding to each of the software parts. In the example shown in FIG. 11, it is shown that "Prod002" as the target product includes the software having the software identifiers of "SBOM1002", "SBOM2102", "SBOM3456", and "SBOM7803".

FIG. 12 is a diagram showing an example of a screen display that the notification information display unit 302 outputs to the output device 204. Here, FIG. 12 shows an example where there is vulnerability in "SBOM3456" included in "Prod002" shown in FIG. 11. In FIG. 12, a first window 204-1 is displayed on the information collection server 102-1 of the first company 100-1, a second window 204-2 is displayed on the information collection server 102-3 of the third company 100-3, and a third window 204-3 is displayed on the information collection server 102-2 of the second company 100-2. Note that the same display as the second company 100-2 is also displayed in the fourth company.

The software vulnerability information may include software configuration information, vulnerability information, product number, part number, and manufacturer. The software configuration information is included in the software configuration information 51. The vulnerability information is acquired from the vulnerability information disclosure server 112. In this example, since vulnerability was included in the software manufactured by the second company 100-2, the first window 204-1 to be output to the first company 100-1 specifies the identifier of the parts with vulnerability and their manufacturer in addition to the product number. Moreover, as the product number and the part number in the first window 204-1, the appellation in the first company 100-1 is indicated.

Meanwhile, the second window 204-2 includes the identifier of the commodity including the inherent software with vulnerability and the software part number in addition to the software configuration information and the vulnerability information. Moreover, as the commodity identifier and the software part number, the appellation in the third company 100-3 is indicated. With the second company 100-2 and the fourth company displayed in the third window 204-3, vulnerability information is not displayed since no vulnerability was discovered in the software included in the products shipped by these companies.

Figure 13:
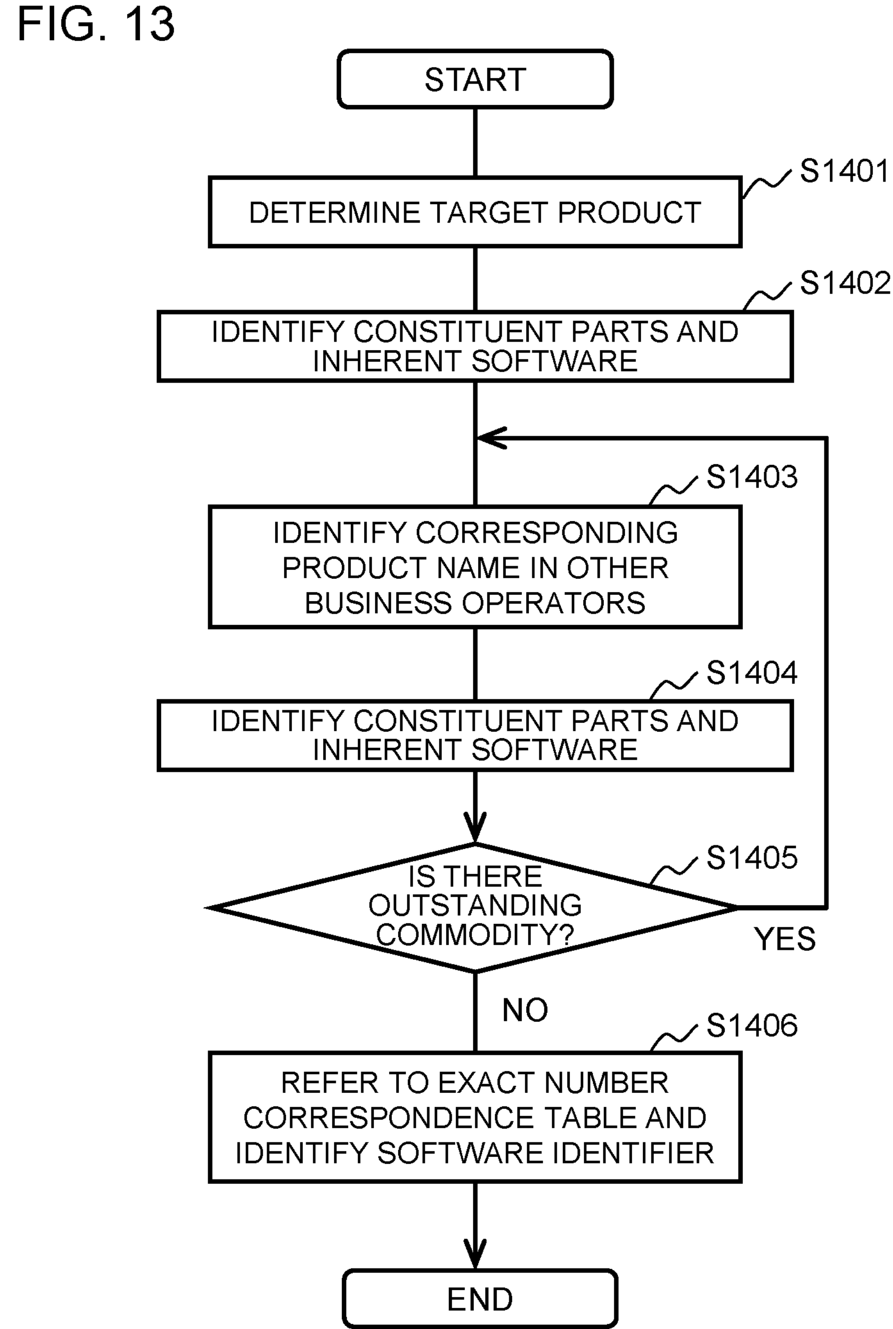
FIG. 13 is a flowchart showing the processing of the included software identification unit.

FIG. 13 is a flowchart showing the processing of the included software identification unit 401. The included software identification unit 401 foremost determines the target product in step S1401. The target product may be determined based on the instructions from the user via the input device 203, or the products indicated in the physical inclusion table 53 may be used as the target product one by one. In subsequent step S1402, the included software identification unit 401 refers to the physical inclusion table 53 and the inherent software table 54, and identifies the parts and the inherent software included in the target product.

In subsequent step S1403, the included software identification unit 401 refers to the the business operator correlation table 55, and identifies the corresponding product name in the other business operators 100 of the parts. In subsequent step S1404, the included software identification unit 401 refers to the physical inclusion table 53 and the inherent software table 54, and identifies the parts and the inherent software included in the product identified in step S1403. In subsequent step S1405, the included software identification unit 401 determines whether there is any outstanding commodity. An outstanding commodity is a commodity in which the components parts have not been identified using the physical inclusion table 53. To put it differently, a commodity that is not the subject of processing of step S1404 is an outstanding commodity. The included software identification unit 401 returns to step S1403 upon determining that there is an outstanding commodity, and proceeds to step S1406 upon determining that there is no outstanding commodity.

In step S1406, the included software identification unit 401 refers to the exact number correspondence table 52, identifies the software identifier of the inherent software identified in step S1402 and step S1404, and then ends the processing shown in FIG. 13.

FIG. 14 is a flowchart showing the processing of the vulnerability analysis unit 402. In step S1500, the vulnerability analysis unit 402 acquires software vulnerability information from the vulnerability information disclosure server 112. The software vulnerability information includes a combination of at least the software identifier and the vulnerability information. Next, the vulnerability analysis unit 402 repeats the processing of step S1502 to S1504 for the number of stored software identified by sequentially changing the software identifier to be processed. For example, in case where the software configuration information 51 is the information shown in FIG. 5, since a total of five software identifiers are indicated, the processing of step S1502 to S1504 is repeated five times.

In step S1502, the vulnerability analysis unit 402 determines whether the software identifier to be processed is included in the software vulnerability information. The vulnerability analysis unit 402 proceeds to step S1503 upon determining that the software identifier to be processed is included in the software vulnerability information, and proceeds to step S1505 upon determining that the software identifier to be processed is not included in the software vulnerability information. In step S1503, the vulnerability analysis unit 402 extracts the composition of the software corresponding to the software identifier to be processed in the software configuration information 51.

In subsequent step S1504, the vulnerability analysis unit 402 refers to the product configuration graph 56 and creates or updates a list of commodities containing the software indicated by the software identifier to be processed (hereinafter referred to as the "vulnerability inclusion list"). Specifically, the vulnerability inclusion list is created when step S1504 is executed for the first time, and the vulnerability inclusion list is edited and updated when step S1504 is executed for the second time onward. For example, if vulnerability is discovered in "SBOM3456" in the product configuration graph 56 shown in FIG. 11, "Prod002", "Part2-02", and "100213" will be indicated in the vulnerability inclusion list.

When the repeated processing of steps S1501 to S1505 is completed, the vulnerability analysis unit 402 sequentially changes the business operator to be processed and performs the repeated processing of steps S1507 to S1508 for all business operators. In step S1507, the vulnerability analysis unit 402 refers to the physical inclusion table 53 in the business operator to be processed, and determines whether a commodity is indicated in the vulnerability inclusion list. The vulnerability analysis unit 402 proceeds to step S1508 upon determining that a commodity is indicated in the vulnerability inclusion list, and proceeds to step S1510 upon determining that a commodity is not indicated in the vulnerability inclusion list.

In step S1508, the vulnerability analysis unit 402 generates notification information to be notified to the business operator to be processed, and causes the vulnerability information notification unit 403 to send the notification information to the business operator to be processed. Specifically, the vulnerability analysis unit 402 generates the software vulnerability information as shown in FIG. 12. Here, the vulnerability analysis unit 402 uses a name that is inherent to each business operator 100. For example, while "Part2-02" in the first company 100-1 and "100213" in the third company 100-3 refer to the same commodity, "Part2-02" is used in the notification information to the first company 100-1, and "100213" is used in the notification information to the third company 100-3.

Figure 15:
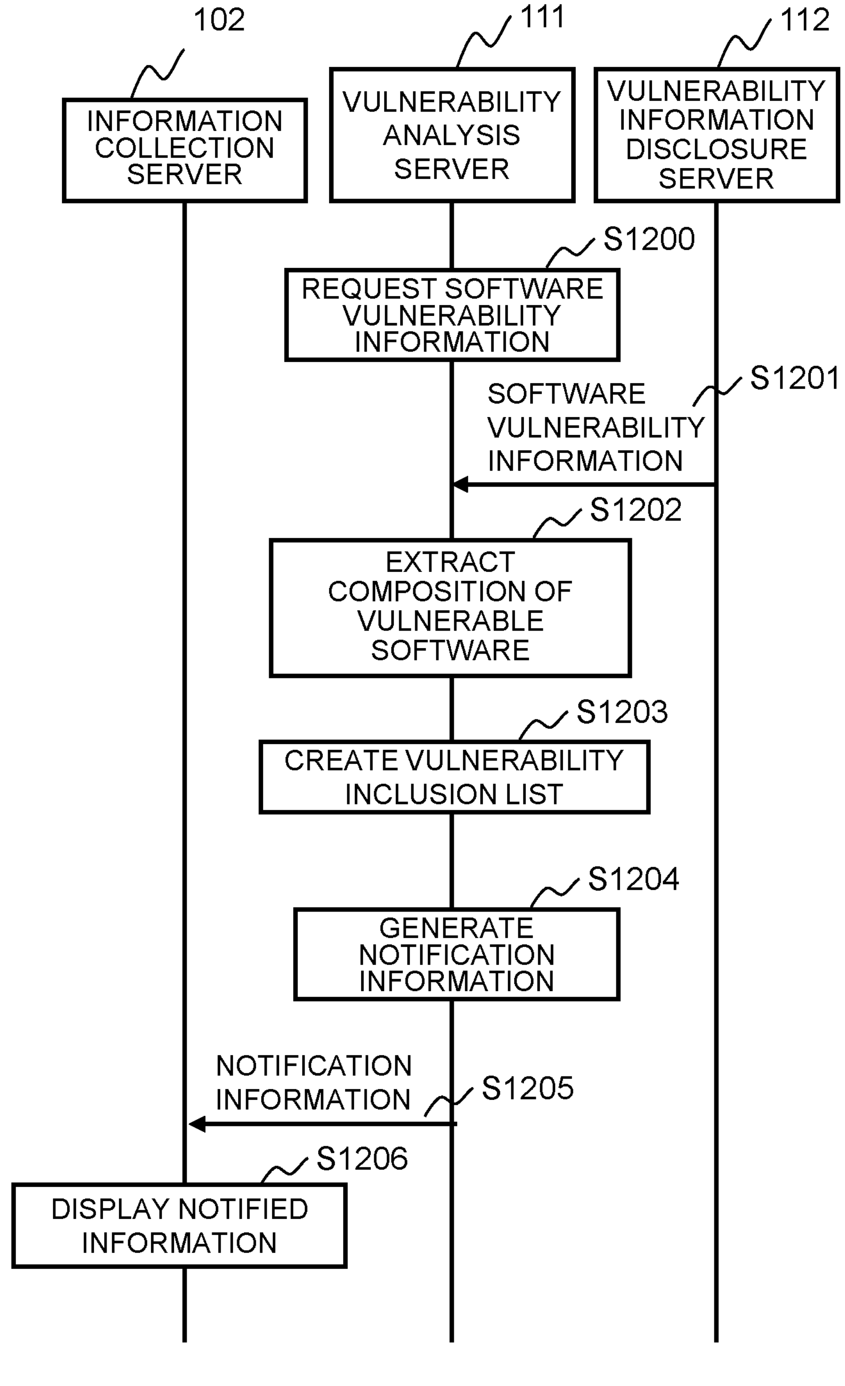
FIG. 15 is a sequence diagram showing the processing of the vulnerability analysis unit and the vulnerability information notification unit.

FIG. 15 is a sequence diagram showing the processing of the vulnerability analysis unit 402 and the vulnerability information notification unit 403. Foremost, the vulnerability analysis unit 402 of the vulnerability analysis server 111 requests software vulnerability information to the vulnerability information disclosure server 112 (S1200). In response to this request, the vulnerability information disclosure server 112 sends the software vulnerability information to the vulnerability analysis server 111 (S1201). The processing of S1200 and S1201 corresponds to step S1500 of FIG. 14. Next, the vulnerability analysis unit 402 extracts the composition of the software with vulnerability from the software configuration information 51 (S1202). This processing corresponds to step S1503 of FIG. 14. Next, the vulnerability analysis unit 402 creates the vulnerability inclusion list (S1203). This processing corresponds to step S1504 of FIG. 14.

Next, the vulnerability analysis unit 402 generates notification information (S1204), and causes the vulnerability information notification unit 403 to send the generated notification information (S1205). S1204 and S1205 correspond to step S1508 of FIG. 14. The notification information display unit 302 of the information collection server 102 that received the foregoing notification information displays the notified information on the output device 204.

According to the first embodiment described above, the following effects can be obtained.

(1) A vulnerability analysis method to be executed by a vulnerability analysis server 111, which is a computer, includes the following processing performed by an information collection unit 400, an included software identification unit 401, and a vulnerability analysis unit 402. The information collection unit 400 acquires a component parts identifier, which is an identifier of component parts as parts configuring a product for each identifier of the product from each of a plurality of business operators 100, and business operator inherent data 50 including an identifier of proprietary software as software configuring the product but not included in the component parts. The included software identification unit 401 performs identification of a correspondence of an identifier of the product and the component parts identifier between different business operators 100 based on a previously created business operator correlation table 55 (S1403 of FIG. 13), and identification of a target product as a product to be investigated (S1401 of FIG. 13). The vulnerability analysis unit 402 identifies all of the proprietary software included in the target product, and identifies vulnerability of software included in the target product by referring to a vulnerability DB storing data related to vulnerability of software. Thus, vulnerability of software can be analyzed across a plurality of business operators 100 configuring a supply chain.

(2) The business operator inherent data 50 includes an exact number correspondence table 52 indicating a correspondence of a software part number as an identifier of software inherent to the business operator 100, and a software identifier as an identifier of software common to the plurality of business operators 100. Thus, each business operator 100 can flexibly set the software part number, thereby simplifying the process.

(3) The processing executed by the vulnerability analysis server 111 includes notification processing of notifying information related to the identified vulnerability to each of the business operators 100 (S1510 of FIG. 14, S1205 of FIG. 15). Thus, each business operator 100 can know of the vulnerability of software included in the parts that it is not manufacturing.

(4) An identifier of the product is assigned for each production lot of the product or each design of the product. Thus, the vulnerability of software can be analyzed for each lot or for each design.

Modified Example 1

In the first embodiment described above, the two items of software identifier and software part number were used for identifying the software. Nevertheless, only the software identifier may be used for identifying the software without using the software part number. In other words, here, the software identifier is used in each business operator 100 in substitute for the software part number.

Modified Example 2

In the first embodiment described above, the identifier of the product and its parts was used for identifying the production lot or design, and the same identifier was assigned to products manufactured in the same production lot. Nevertheless, the identifier of the product and its parts may also be a so-called individual piece identification number, which is an identifier for identifying each product and each part.

Second Embodiment

The second embodiment of the vulnerability analysis method and the vulnerability analysis system is now explained with reference to FIG. 16 to FIG. 18. In the following explanation, the same constituent elements as the first embodiment are given the same reference numeral, and the differences will be mainly explained. When no specific explanation is provided, then it is the same as the first embodiment. This embodiment differs from the first embodiment mainly with respect to the point that the purchasers of the product are also managed.

FIG. 16 is a configuration diagram of the information collection server 102 and the vulnerability analysis server 111 in the second embodiment. The information collection server 102 in this embodiment additionally comprises a sales information collection unit 309. The sales information collection unit 309 collects sales data of the product from the site information accumulation server 101, and generates a customer list 59. In this embodiment, data in which the customer list 59 has been added to the software configuration information 51, the exact number correspondence table 52, the physical inclusion table 53, and the inherent software table 54 is referred to as business operator inherent data 50A. The business operator inherent data 50A is collected by the information collection unit 400 of the vulnerability analysis server 111.

FIG. 17 is a diagram showing an example of the customer list 59. Specifically, FIG. 17 shows customer lists 59-1 to 59-3 that can be obtained from each of the first company 100-1, the second company 100-2, and the third company 100-3. The customer list 59 has one or more records, and each record includes a customer number and a product number. Nevertheless, in the following explanation, the customer list 59 is also referred to as "purchaser data".

The vulnerability analysis unit 402 in this embodiment refers to the customer list 59 and includes the customer number in the notification information. Specifically, the vulnerability analysis unit 402 refers to the customer list 59 and identifies the customer number corresponding to the product number to be included in the notification information, and adds the identified customer number to the notification information.

FIG. 18 is a diagram showing an example of a screen display that the notification information display unit 302 outputs to the output device 204 in the second embodiment. The difference in comparison to FIG. 12 in the first embodiment is the that the customer column has been added to the right side.

According to the second embodiment described above, the following effects can be obtained.

(5) An identifier of the product is an individual piece identification number for identifying an individual piece. The processing of the vulnerability analysis server 111 includes collecting a customer list 59 as purchaser data indicating a correspondence of a customer identifier for identifying a purchaser of the product and an identifier of the product, and notifying, with regard to the product including the software having the vulnerability identified in the vulnerability identification processing, information related to the identified vulnerability to the business operator that manufactured the product, and the customer identifier indicating the customer that purchased the product who was identified using the purchaser data. Thus, customers who purchased the product containing software with vulnerability can be easily identified.

Modified Example of Second Embodiment

In the second embodiment described above, the vulnerability analysis server 111 identified the customer number. Nevertheless, the information collection server 102 may identify the customer number in substitute for the vulnerability analysis server 111. In other words, the information collection server 102 may refer to the customer list 59 and identify the customer number corresponding to the product number indicated in the software vulnerability information received from the vulnerability analysis server 111, and add the identified customer number to the software vulnerability information. Here, the information collection server 102 does not need to send the customer list 59 to the vulnerability analysis server 111.

In each of the embodiments and modified examples described above, the configuration of the functional blocks is merely an example. Several of the functional configurations indicated as separate functional blocks may be configured integrally, and the configuration represented with one functional block diagram may be divided into two or more functions. Moreover, the configuration may also be such that a part of the functions of each functional block is equipped in another functional block.

In each of the embodiments and modified examples described above, the vulnerability analysis server 111 may also comprise an I/O interface (not shown), and programs may be read into the storage device 202 of the vulnerability analysis server 111 from another apparatus via the I/O interface and a medium that can be used by the vulnerability analysis server 111 as needed. Here, a "medium" refers to, for example, a storage medium that can be attached to and removed from the I/O interface, or a communication medium such as a wired, wireless or optical network, or carrier waves or digital signals that propagate along the network. Moreover, a part or all of the functions realized by programs may also be realized with a hardware circuit or FPGA.

Each of the embodiments and modified examples described above may also be combined. While various embodiments and modified examples were explained above, the present invention is not limited to the subject matter thereof. Other modes considered to fall within the technical scope of the present invention are also covered by the scope of the present invention.

REFERENCE SIGNS LIST

1: vulnerability analysis system
50: business operator inherent data
51: software configuration information
52: exact number correspondence table
53: physical inclusion table
54: inherent software table
55: business operator correlation table
56: product configuration graph
100: business operator
101: site information accumulation server
102: information collection server
111: vulnerability analysis server
112: vulnerability information disclosure server
300: software configuration information generation unit
301: manufacturing information collection unit
302: notification information display unit
400: information collection unit
401: included software identification unit
402: vulnerability analysis unit
403: vulnerability information notification unit

The invention claimed is:

1. A vulnerability analysis method executed by a computer, comprising:

acquisition processing of acquiring a component parts identifier, which is an identifier of component parts as parts configuring a product for each identifier of the product from each of a plurality of business operators, and business operator inherent data including an identifier of proprietary software as software configuring the product but not included in the component parts from each of a plurality of business operators;

correspondence identification processing of identifying a correspondence of an identifier of the product and the component parts identifier between different business operators based on previously created correspondence data;

target product identification processing of identifying a target product as a product to be investigated; and vulnerability identification processing of identifying all of the proprietary software included in the target product based on the correspondence identification processing, and identifying vulnerability of software included in the target product by referring to a vulnerability DB storing data related to vulnerability of software, wherein the business operator inherent data includes an exact number correspondence table indicating a correspondence of a software part number as an identifier of software inherent to the business operator, and a software identifier as an identifier of software common to the plurality of business operators, a physical inclusion table is provided as a correspondence table of a product number as an identifier of each product, and a part number as an identifier of parts configuring each product, an inherent software table is provided as a correspondence table of the product number, and a software part number of software which configures each product represented by the product number but is not included in the parts, and a business operator correlation table is created as a table showing the correspondence of the part number and the product number in the different business operators and shows the correspondence of item names and the correspondence of the product number and the part number in the software configuration information, the exact number correspondence table, the physical inclusion table, and the inherent software table, and an included software identification unit refers to the business operator correlation table for identifying any product numbers in one business operator which correspond to a part number in another business operator.

2. The vulnerability analysis method according to claim 1, further comprising:

notification processing of notifying information related to the vulnerability identified in the vulnerability identification processing to each of the business operators.

3. The vulnerability analysis method according to claim 1, wherein an identifier of the product is assigned for each production lot of the product or each design of the product.

4. The vulnerability analysis method according to claim 1, wherein an identifier of the product is an individual piece identification number for identifying an individual piece, and the vulnerability analysis method further comprising:

collection processing of collecting purchaser data indicating a correspondence of a customer identifier for identifying a purchaser of the product and an identifier of the product; and notification processing of notifying, with regard to the product including the software having the vulnerability identified in the vulnerability identification processing, information related to the identified vulnerability, and the customer identifier indicating the customer that purchased the product who was identified using the purchaser data to the business operator that manufactured the product.

5. A vulnerability analysis system, comprising:

an information collection unit which acquires a component parts identifier, which is an identifier of component parts as parts configuring a product for each identifier of the product from each of a plurality of business operators, and business operator inherent data including an identifier of proprietary software as software configuring the product but not included in the component parts from each of a plurality of business operators;

an included software identification unit for creating a product configuration graph indicating a relation of the product and the proprietary software by identifying a correspondence of an identifier of the product and the component parts identifier between different business operators based on previously created correspondence data and the business operator inherent data; and a vulnerability analysis unit for identifying all of the proprietary software included in target product as target to be investigated, and identifying vulnerability of software included in the target product by referring to a vulnerability DB storing data related to vulnerability of software, wherein the business operator inherent data includes an exact number correspondence table indicating a correspondence of a software part number as an identifier of software inherent to the business operator, and a software identifier as an identifier of software common to the plurality of business operators, a physical inclusion table is provided as a correspondence table of a product number as an identifier of each product, and a part number as an identifier of parts configuring each product, an inherent software table is provided as a correspondence table of the product number, and a software part number of software which configures each product represented by the product number but is not included in the parts, and a business operator correlation table is created as a table showing the correspondence of the part number and the product number in the different business operators and shows the correspondence of item names and the correspondence of the product number and the part number in the software configuration information, the exact number correspondence table, the physical inclusion table, and the inherent software table, and the included software identification unit refers to the business operator correlation table for identifying any product numbers in one business operator which correspond to a part number in another business operator.

6. The vulnerability analysis system according to claim 5, further comprising:

a vulnerability information notification unit which notifies information related to the vulnerability identified by the vulnerability analysis unit to each of the business operators.

7. The vulnerability analysis system according to claim 5, wherein an identifier of the product is assigned for each production lot of the product or each design of the product.

8. The vulnerability analysis system according to claim 5, wherein an identifier of the product is an individual piece identification number for identifying an individual piece, and wherein the information collection unit additionally collects purchaser data indicating a correspondence of a customer identifier for identifying a purchaser of the product and an identifier of the product, and wherein the vulnerability analysis system, with regard to the product including the software having the vulnerability identified by the vulnerability analysis unit, notifies information related to the identified vulnerability, and the customer identifier indicating the customer that purchased the product who was identified using the purchaser data to the business operator that manufactured the product.

* * * * *